(12) United States Patent
Simioni

(10) Patent No.: US 12,440,427 B2
(45) Date of Patent: Oct. 14, 2025

(54) SKIN DOUGH COMPOSITION

(71) Applicant: Denis Simioni, Saint-Placide (CA)

(72) Inventor: Denis Simioni, Saint-Placide (CA)

( * ) Notice: Subject to any disclaimer, the term of this patent is extended or adjusted under 35 U.S.C. 154(b) by 23 days.

(21) Appl. No.: 18/365,607

(22) Filed: Aug. 4, 2023

(65) Prior Publication Data

US 2024/0041706 A1 Feb. 8, 2024

Related U.S. Application Data

(60) Provisional application No. 63/370,598, filed on Aug. 5, 2022.

(51) Int. Cl.
| | | |
|---|---|---|
| *A61K 8/02* | (2006.01) | |
| *A61K 8/23* | (2006.01) | |
| *A61K 8/34* | (2006.01) | |
| *A61K 8/36* | (2006.01) | |
| *A61K 8/73* | (2006.01) | |
| *A61Q 19/00* | (2006.01) | |
| *A61Q 19/08* | (2006.01) | |

(52) U.S. Cl.
CPC .............. *A61K 8/0212* (2013.01); *A61K 8/23* (2013.01); *A61K 8/345* (2013.01); *A61K 8/361* (2013.01); *A61K 8/732* (2013.01); *A61K 8/737* (2013.01); *A61Q 19/007* (2013.01); *A61Q 19/08* (2013.01); *A61K 2800/87* (2013.01); *A61K 2800/884* (2013.01)

(58) Field of Classification Search
CPC ........ A61K 9/0014; A61K 47/34; A61K 8/34; A61K 8/368; A61K 8/42; A61K 8/4953; A61K 8/498; A61K 8/64; A61K 8/735; A61K 8/87; A61K 9/7007; A61K 8/676; A61K 9/7023; A61K 33/00; A61K 47/02; A61K 47/24; A61K 47/32; A61K 47/38; A61K 8/0208; A61K 8/14; A61K 8/20; A61K 8/4986; A61K 8/553; A61K 8/731; A61K 8/8117; A61K 9/0009; A61K 9/0019; A61K 9/5192; A61K 8/466; A61K 8/347; A61K 2800/596; A61K 8/463; A61K 8/678; A61K 8/345; A61Q 17/005; A61Q 11/00; A61Q 19/10; A61Q 17/04; A61Q 5/006
See application file for complete search history.

(56) References Cited

U.S. PATENT DOCUMENTS

| | | | |
|---|---|---|---|
| 5,013,763 A | * | 5/1991 | Tubesing ............... A61K 8/891 424/195.18 |
| 10,426,723 B2 | | 10/2019 | Gan et al. |
| 10,449,133 B1 | | 10/2019 | Faig et al. |
| 10,940,103 B2 | | 3/2021 | Faig et al. |
| 2003/0069317 A1 | * | 4/2003 | Seitz, Jr. ................ A01N 31/16 514/731 |
| 2006/0104931 A1 | | 5/2006 | Fukutome et al. |
| 2006/0121097 A1 | | 6/2006 | Lodge et al. |
| 2007/0105977 A1 | * | 5/2007 | Gabriel ................ A61K 9/0014 523/122 |
| 2011/0044920 A1 | | 2/2011 | Hines et al. |
| 2014/0155485 A1 | * | 6/2014 | Bannister ............... A61K 47/14 514/570 |
| 2018/0027949 A1 | | 2/2018 | George et al. |

FOREIGN PATENT DOCUMENTS

| | | | | |
|---|---|---|---|---|
| CN | 109223588 A | | 1/2019 | |
| GB | 2535562 A | * | 8/2016 | ............... A61K 9/70 |
| KR | 20180110474 A | | 10/2018 | |
| WO | WO2006/091719 A2 | * | 8/2006 | ............. A61K 8/675 |

OTHER PUBLICATIONS

"OTZI Dough Therapy Pore Treatment Mask" Jan. 29, 2021 (Jan. 29, 2021) [Retrieved on Oct. 18, 2023 from Internet] https://incidecoder.com/products/otzi-dough-therapy-pore-treatment-mask.

* cited by examiner

*Primary Examiner* — Audrea B Coniglio

(57) ABSTRACT

A cosmetic and dermatological skin dough composition that can be used for occlusive therapy for skin. A moldable, shapable dough for skin and dermatological treatment that can be used on its own with a hydrating solution to hold and deliver active ingredients and hydration to the skin, hair, or scalp, or remove nail polish. When molded or shaped to fit onto skin, the skin dough provides a vehicle for tight and uniform dermal adhesion resulting in complete cutaneous contact around areas that include skin folds and filling in lines and wrinkles to provide skin hydration and also deliver effective active ingredients.

15 Claims, 5 Drawing Sheets skin dough composition skin dough composition with optional texturing before treatment after treatment before treatment after 1 minute after 30 minutes before treatment during treatment after treatment

SKIN DOUGH COMPOSITION

CROSS-REFERENCE TO RELATED APPLICATION

This application claims priority to U.S. provisional patent application US63/370,598 filed 5 Aug. 2022, which is hereby incorporated by reference herein in its entirety.

FIELD OF THE INVENTION

The present invention relates generally to compositions and methods of making dermatological skin doughs that can be used for occlusive therapy for skin. The presently described dermal or skin dough composition can be used to improve the skin's visual appearance, increase skin hydration, and remove nail polish.

BACKGROUND

Skin acts as our natural protective barrier against injury, such as mechanical, thermal, chemical, radiative, and physical injury. Skin also protects us from infection, however is easily damaged and changes as we age. In particular, over time the outer skin layer (epidermis) of aging skin thins, the number of pigment-containing cells (melanocytes) decreases, and changes in the connective tissue reduce the skin's strength and elasticity. Apart from the natural aging process, external factors come into play and can cause premature aging, with a primary culprit being the damage caused by the sun's ultraviolet (UV) rays. Exposure to UV rays can cause premature aging and signs of sun damage such as wrinkles, leathery skin, liver spots, actinic keratosis, and solar elastosis. The most common effect of extreme UV exposure is erythema, the familiar skin reddening also referred to as sunburn. In addition, most people will tan from the UV stimulation of melanin production, which occurs within a few days following exposure. A further, less obvious adaptive effect is the thickening of the outermost layers of the skin that reduces UV penetration to the deeper layers of the skin. Both changes are a sign of damage to the skin.

Susceptibility to skin damage depends on skin type, with consistent exposure to UV radiation also causing a number of progressive changes in the cells, fibrous tissue, and blood vessels of the skin. These include freckles, nevus formations, and lentigines, which are dark pigmented areas of the skin. UV radiation accelerates skin aging, and the gradual loss of the skin's elasticity results in wrinkles and dry, coarse skin. Additionally, exposure to UV rays can cause the formation of free radicals, reactive oxygen species, and reactive nitrogen species that can damage the skin and components of the skin cells such as DNA. Normally, the body's internal and external defense against free radical scavengers are antioxidants. If, however, free radicals overwhelm the body's natural defense mechanism, a condition known as oxidative stress supervenes and can ultimately damage the skin's proteins, lipids, and DNA, which can trigger a number of human disease states. Chronic exposure to UV and its negative effects is generally referred to as photo aging.

Cosmetic face and skin masks can be used to treat skin on the face, hydrate the skin, or deliver an active ingredient to or through the skin. Facial sheet masks and facial creams and gel masks have become a trend in the beauty industry to renew the skin's appearance on the face for a more youthful and radiant glow. Facial sheet masks are used as a type of occlusion or occlusive therapy, which is a skin treatment method that involves sealing an area of the skin in a waterproof dressing with a hydrating agent to increase the absorption of water and topical treatments into the skin by potentiating the deep penetration of active ingredients and water into the deeper layers of the skin.

Sheet masks for the face generally come as a whole face mask which covers the whole face, or as partial masks for treatment of, for example, only the eyes, nose, cheeks, forehead, or neck. Sheet masks generally comprise a substrate such as a fabric, sheet, or insoluble layer, on which is bound to or has bound to it a cosmetic composition. In one example of a sheet face mask, United States patent application publication number US20180027949A1 to George et al. describes a deformable sheet-like under-eye mask that delivers a dermatological composition comprising one or more skin active ingredients to the skin. Sheet masks are generally a one-time use product and the application of sheet masks can result in air pockets underneath the sheet or barrier due to their non-customized fit, resulting in certain areas of the face not receiving complete treatment with the mask due to lack of epidermal contact. Facial sheet masks generally come as a one size fits all, however, not everyone has the same facial shape or size. They can also lack the ability for tight epidermal adhesion in particular areas of the face, such as the contours including nasolabial folds and glabella lines, hindering their ability to directly fill in lines and wrinkles. Facial sheet masks can also be challenging to apply and can be bulky, overlapping, too tight, and difficult to unfold once out of the packaging. Facial sheet masks that use a cream or lotion or gel can also be a drippy mess, and it is usually recommended to be in a supine position when using them due to their inability to adhere to the skin when in an upright position.

Flowable cream-type and gel-type mask compositions lack the barrier component of occlusive therapy but provide active ingredients in a cream or gel applied directly to the skin. These flowable facial masks are generally applied to the skin, kept on for a period of time, and later removed by peeling, rubbing, flaking, washing, or a combination thereof. Facial cream or gel masks generally address one or two areas of concern, such as hydration or dull-looking skin, however lack the occlusive aspect to potentiate the deep penetration of active ingredients and water into the deeper wrinkles and layers of the skin. In one example of a topical skin care formulations which can be formulated as a flowable face mask, U.S. Pat. No. 10,668,009B2 to Carle et al. describes a method for treating a person's skin using a composition comprising an extract from *Tetracentron sinense* in a topical formulation.

Consumers who are particular about their skincare regime often have more than one facial cream or mask to resolve their areas of need and concerns. It is widely believed that the skin has a variety of changing conditions, and keeping up a good skincare routine should consider changes in the environment, hormones, weather, and mood. In particular, a more hydrating mask may be desirable in winter, a more clarifying mask on the day of a workout, or an exfoliating mask when there is a need to slough off dead skin cells.

This background information is provided for the purpose of making known information believed by the applicant to be of possible relevance to the present invention. No admission is necessarily intended, nor should be construed, that any of the preceding information constitutes prior art against the present invention.

SUMMARY OF THE INVENTION

An object of the present invention is to provide a skin dough composition and method of making dermatological skin doughs that can be used for occlusive therapy for skin. The presently described dermal or skin dough composition can be used to improve the skin's visual appearance, increase skin hydration, and delivery dermally active ingredients in occlusive therapy.

In an aspect there is provided a skin dough composition comprising: about 1.0 wt. % to about 15 wt. % of an emulsifier; about 10 wt. % to about 40 wt. % of glycerin; about 20 wt. % to about 40 wt. % of C6-C18 medium chain glycerides; about 0.1 wt. % to about 5.0 wt. % of hydroxypropyl guar; and about 1.0 wt. % to about 40.0 wt. % of a C16-C18 fatty acid salt, wherein all weight percentages are based on the total weight of the skin dough composition.

In another aspect there is provided a skin dough composition comprising: an emulsifier; glycerin; C6-C18 medium chain glycerides; hydroxypropyl guar; and a stearic acid salt.

In an embodiment of the skin dough composition, the C6-C18 medium chain glyceride comprises glycerol having two or three straight chain C6-C18 fatty acid esters.

In another embodiment of the skin dough composition, the skin dough is malleable and can be flattened to a thickness of at least 3 mm without breaking.

In another embodiment, the skin dough composition further comprises an additional starch selected from one or more of hydroxypropyl methylcellulose, corn starch, wheat starch, rice starch, sorghum starch, pea starch, potato starch, tapioca, sweet potato starch, sago starch, pullulan, and dimethyl imidazolidinone crosslinked rice starch.

In another embodiment, the additional starch is in the skin dough composition is at about 0.1 wt. % to about 30 wt. % of the composition.

In another embodiment of the skin dough composition, the skin dough composition is free of water.

In another embodiment of the skin dough composition, the skin dough is moldable and retains its shape upon molding.

In another embodiment, the skin dough composition further comprises an active ingredient for antibacterial, antifungal, analgesic, increasing circulation, blood clotting, skin whitening, improving skin wrinkles, blocking ultraviolet rays, minimizing pores, inhibition of neurons for pain transmission, moisturizing, keratolysis, desquamation, keratinocyte proliferation enhancement, collagenase inhibition, elastase inhibition, anti-inflammatory, steroid treatment, anti-acne treatment, and antioxidant treatment.

In another embodiment of the skin dough composition, the hydroxypropyl guar has a molecular weight of between about 2-5 million Daltons.

In another embodiment, the skin dough composition further comprises one or more cellulosic gum selected from *sclerotium* gum, xanthan gum, gum Arabic, and mastic gum.

In another embodiment, the skin dough composition further comprises one or more of silica, clay, zinc oxide, poloxamer, or charcoal.

In another aspect there is provided a method for occlusive skin therapy comprising: molding a skin dough composition comprising an emulsifier, glycerin, C6-C18 medium chain glycerides, hydroxypropyl guar, and a C16-C18 fatty acid salt into an occlusive dough pad; applying a hydrating solution to a skin treatment area; applying the occlusive dough pad to the skin treatment area; and waiting a treatment time to provide occlusive therapy to the skin treatment area.

In an embodiment of the method, the hydrating solution comprises one or more of water, glycerin, or a hydrating gel.

In another embodiment of the method, the hydrating solution comprises one or more dermal active ingredient.

In another embodiment of the method, the dermal active ingredient is one or more of a fruit acid, botanical extract, *Spilanthes acmella*, amino acid, vitamin, mineral, sodium silicate, hyaluronic acid, alpha-hydroxy acid, glycolic acid, lactic acid, tartaric acid, citric acid, beta hydroxy acid, salicylic acid, kojic acid, retinol, L-ascorbic acid, niacinamide, dimethicone, copper peptide, linseed extract, rice protein, caffeine, hesperetin laurate, ceramide, cholesterol, proxylane, and ascorbyl glucoside.

In another embodiment of the method, the dermal active ingredient is a humectant, whitening agent, depigmenting agent, antibacterial, antifungal, analgesic, agent for increasing circulation, blood clotting agent, sunscreen, pore minimizing agent, moisturizing, keratolysis agent, desquamation agent, keratinocyte proliferation agent, collagenase inhibition agent, elastase inhibition agent, anti-inflammatory, steroid, anti-acne agent, and antioxidant.

In another embodiment of the method, the skin treatment area is the face, neck, chest, arms, legs, feet, hands, back, hairline, chin, or décolleté.

In another embodiment of the method, the treatment time is 1 minute to 180 minutes.

In another aspect there is provided a face mask kit comprising: a skin dough composition comprising an emulsifier, glycerin, C6-C18 medium chain glycerides, hydroxypropyl guar, and a C16-C18 fatty acid salt; and a hydrating solution.

In an embodiment of the kit, the hydrating solution comprises one or more of water, hyaluronic acid, glycerin, aloe, propylene glycol, hydrating gel, alpha hydroxy acids, and urea.

In another embodiment, the kit further comprises a supply of cellulosic starch to reduce the stickiness of the skin dough.

In an embodiment of the kit, the hydrating solution is a liquid moisturizer, spray, or gel.

In an embodiment of the kit, the hydrating solution comprises one or more dermal active ingredient.

In an embodiment, the kit further comprises a booster that can be added to the dough before treatment.

Embodiments of the present invention as recited herein may be combined in any combination or permutation.

BRIEF DESCRIPTION OF THE FIGURES

For a better understanding of the present invention, as well as other aspects and further features thereof, reference is made to the following description which is to be used in conjunction with the accompanying figures which illustrate embodiments or aspects of the invention, where.

DETAILED DESCRIPTION OF THE INVENTION

Figure 1:
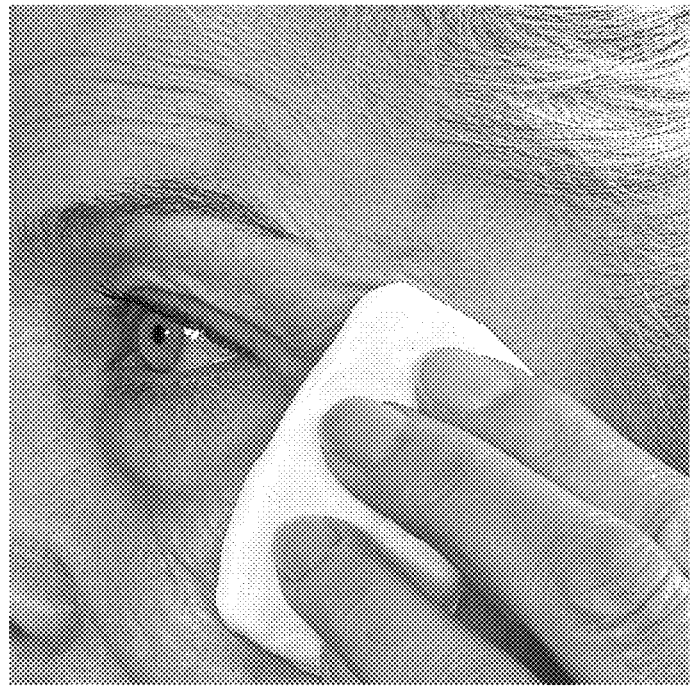
FIG. 1 is a set of photographs of a model applying the skin dough and with the skin dough after optional texturing.
Figure 1:

Unless defined otherwise, all technical and scientific terms used herein have the same meaning as commonly understood by one of ordinary skill in the art to which this invention belongs.

As used in the specification and claims, the singular forms "a", "an" and "the" include plural references unless the context clearly dictates otherwise.

The term "comprise" and any of its derivatives (e.g. comprises, comprising) as used in this specification is to be taken to be inclusive of features to which it refers, and is not meant to exclude the presence of any additional features unless otherwise stated or implied. The term "comprising" as used herein will also be understood to mean that the list following is non-exhaustive and may or may not include any other additional suitable items, for example one or more further feature(s), component(s) and/or element(s) as appropriate.

As used herein, the terms "having," "including," and "containing," and grammatical variations thereof, are inclusive or open-ended and do not exclude additional, unrecited elements and/or method steps, and that that the list following is non-exhaustive and may or may not include any other additional suitable items, for example one or more further feature(s), component(s) and/or element(s) as appropriate. A composition, device, article, system, use, process, or method described herein as comprising certain elements and/or steps may also, in certain embodiments consist essentially of those elements and/or steps, and in other embodiments consist of those elements and/or steps and additional elements and/or steps, whether or not these embodiments are specifically referred to.

As used herein, the term "about" refers to an approximately +/−10% variation from a given value. It is to be understood that such a variation is always included in any given value provided herein, whether or not it is specifically referred to. The recitation of ranges herein is intended to convey both the ranges and individual values falling within the ranges, to the same place value as the numerals used to denote the range, unless otherwise indicated herein.

As used herein, the terms "dough" and "putty" are used interchangeably to refer to a thick, malleable material that can be molded and generally holds its shape after molding.

The use of any examples or exemplary language, e.g. "such as", "exemplary embodiment", "illustrative embodiment," and "for example" is intended to illustrate or denote aspects, embodiments, variations, elements or features relating to the invention and not intended to limit the scope of the invention.

Herein is described a cosmetic and dermatological skin dough composition that can be used for occlusive therapy for skin. The presently described composition is a moldable, shapable dough that can be used on its own or with a hydrating solution or as the delivery vehicle to hold and deliver active ingredients to the skin, hair, or scalp. When molded and shaped to fit onto skin, the skin dough provides a vehicle for occlusive therapy for tight and uniform dermal adhesion resulting in complete cutaneous contact around areas that include skin folds and filling in lines and wrinkles to provide skin hydration and also deliver effective active ingredients. The occlusive therapy delivery provided by the presently described skin dough composition enables transport of water as well as active ingredients in an occlusive manner through the epidermis for effective and lasting skin hydration. The occlusive environment created by the skin dough composition against the skin assists in the penetration of water into the epidermis, and also other treatment-specific active ingredients that contribute to skin hydration, rejuvenation, and healing. In this way, the skin dough composition serves as a hydration delivery system by providing a malleable complex which, together with a hydrating solution, deliver water and active skin ingredients directly to the skin.

The presently described skin dough composition can also be used with a solvent cream to effectively remove nail polish from nails.

The presently described skin dough composition is a malleable dough or putty which does not dry out over the treatment period and has been found to remain malleable over a long period of time. This non-drying malleable skin dough compound can be flattened to any shape to create a perfect custom fit to the skin for secure and tight dermal adhesion while excluding air and air bubbles to deliver consistent treatment to the skin under the dough layer. By flattening the skin dough and then applying gentle pressure to the flattened dough while in contact with skin, the present skin dough composition can be easily and gently molded into lines and wrinkles of the skin for the transport of actives into the various levels of the skin, providing effective occlusive therapy to the skin. The skin dough is malleable and flexible enough to easily conform to all shapes, contours, features, and sizes of skin and body parts for a customized fit with application of light pressure with limited to no deformation or shrinkage after molding the skin dough into an occlusive dough pad for therapeutic use. The dermatological treatment system offered by the present skin dough composition allows for a tight, uniform dermal adhesion across all contours of the skin while filling in lines and wrinkles and being gentle on areas of damaged or painful skin.

The impermeable occlusive aspect of the skin dough composition application increases the epidermal penetration of water and any active agents in a hydrating solution which is applied under the dough, as well as any active agents in the dough itself. Occlusion therapy with the present skin dough has been found to lead to an increased moisture content of the skin as well as increased percutaneous absorption of the active agents, maximizing their efficacy and beautifying attributes. The skin dough composition is preferably used accompanied by a hydrating solution, where the hydrating solution and/or skin dough composition optionally comprises added active agents to address consumer needs and concerns. Some cosmetic consumer skin needs and concerns can be any of the following but are not limited to: 1) reducing the appearance of fine lines and wrinkles; 2) improving the radiance and glow of dull-looking skin; 3) lifting, firming and tightening of weakened, sagging skin; 4) improving the texture and tone of the skin; 5) minimizing the appearance of enlarged pores and/or pore-refining; 6) improving smoothness and softness of photo-aged skin; 7) reducing skin discomfort; 8) hydrating dry, parched skin; and 9) delivering one or more actives via the moldable, occlusive skin dough composition.

The present cosmetic skin dough composition is a moldable, self-forming, customized application beauty and dermatological treatment that adapts to all facial shapes, body part shapes, and sizes, and allows for the complete control of application using gentle pressure from fingertips, ensuring no area of the skin is missed. Although the present composition is primarily described herein for use as a face mask, it is understood that the same may be used for parts of the face, for example the eyes, forehead, chin, nose, lips, around the hairline, and around the nasolabial folds of the mouth. The skin dough may also be used to treat other areas on the skin not on the face, including but not limited to the neck, chest, arms, legs, feet, lips, hands and back. The skin dough can also be used in a variety of different locations, such as up to and in the hairline, below the chin, and down to the décolleté (neckline or cleavage). For hydration therapy, the skin dough composition can be applied anywhere skin hydration is desired, to provide lifting, smoothing, moisturizing, and tightening benefits. By ensuring tight adhesion of the skin dough to the skin via the hydrating solution, the presently described skin dough provides an occlusive barrier on the skin so that the active ingredients have no place to go but into the skin.

The herein described skin dough composition can be used as a beauty or cosmetic product to improve the skin's visual appearance and provides a delivery system whereby additive active ingredients can be incorporated into the treatment to address individual concerns. The active additive ingredients can be provided in or added to the skin dough itself, can be in the hydrating solution used with the skin dough, or both. Active ingredients can be selected and incorporated into the skin dough and/or hydration solution for treatment using the skin dough to address individual concerns. For example, active ingredients and amounts of each ingredient can be selected to enable specific skin dough and/or hydration solution formulations to address a broad range of skin concerns and skin types. In certain aspects, the compositions disclosed herein can include, for example, a combination of ingredients to exfoliate, reduce sensorial skin discomfort, renew the skin, increase skin radiance, reduce lines and wrinkles through the relaxation of facial muscular contractions, reduce the appearance of enlarged pores, improve skin texture and/or increase skin smoothness.

Although reference is made herein to a cosmetic and/or dermatological skin dough composition, it is understood that the presently described dough may also find utility in treating medical and dermatological conditions and in a broad range of occlusive therapies to deliver pharmaceutically active compounds to and through skin. Some non-limiting examples of possible dermatological treatments that that present skin dough composition may be used in include but are not limited to eczema, rosacea, psoriasis, wound care, burn care, insect bites, sunburn, diabetes skin care, tattoo healing, and acne care. The skin dough composition may also be used in combination with microdermabrasion or ultrasound to increase penetration of actives into the skin resulting from the occlusive therapy with the skin dough treatment. The present skin dough is easily removable leaving little to no residue and the leftover hydrating solution will not clog pores. In the treatment of injured or damages skin, the gentle occlusive treatment provided by the skin dough is non-reactive, non-allergenic, non-comedogenic, appropriate for sensitive skin, hypoallergenic, and non-toxic.

General Skin Dough Composition

The present skin dough composition comprises a combination of an emulsifier, glycerin, hydroxypropyl guar, a source of C6-C18 medium chain glycerides, a C16-C18 fatty acid salt, and an optional additional starch. In the combination provided the ingredients form an elastic dough which is moldable and shapable into a flattened layer which can be applied to and molded around skin for a perfect skin fit for occlusive therapy. Formulated without additional water and other labile or volatile ingredients, the present skin dough composition provides long term stability when exposed to air such that it does not dry out, crack or shrink during the treatment time. The skin dough composition is a white to an off-white-colored base with a medium to firm texture accompanied by a sheen-like appearance due to its glycerin and oil-based components. The presently described cosmetic dough composition may be used once, or stored after use for re-use multiple times. The skin dough has also been found to be shelf stable at room temperature.

TABLE 1

General Skin Dough Example

| Component | % wt. | Non-Limiting Examples |
|---|---|---|
| Glycerin | 10-40 | |
| Hydroxypropyl guar | 0.1-5.0 | |
| Emulsifier | 1.0-15.0 | cetyl alcohol, Glyceryl Stearate Citrate |
| Medium chain C6-18 glycerides | 20-40 | texture agent and emollient |
| Additional starch | 0-30 | |
| C16-C18 fatty acid salt | 1-40 | magnesium stearate |

In one embodiment, the skin dough composition may include:
  (i) about 1.0% to about 15.0 wt. %, about 1.0 to about 12.0 wt. %, or about 2.0 to about 8.0 wt. % of an emulsifier, based on the total weight of the skin dough composition, preferably a C6-C18 fatty acid, C6-C18 fatty acid ester, a C6-C18 alcohol, or a mixture thereof;
  (ii) about 10.0 to about 40.0 wt. %, about 10.0 to about 35 wt. %, about 15.0 to about 30 wt. %, or about 20.0 to about 30 wt. % of glycerin based on the total weight of the skin dough composition;
  (iii) about 20.0 to about 40.0 wt. %, about 20.0 to about 35.0 wt. %, or about 25.0 to about 40.0 wt. % of one or more C6-C18 medium chain glyceride, specifically or preferably a C6-C18 chain monoglyceride, diglyceride, or triglyceride, wherein in the diglyceride and triglyceride the fatty acid chains are the same or different, based on the total weight of the skin dough composition, preferably, one or more of a C10-18 diglyceride or triglyceride, caprylic/capric triglyceride, or a mixture thereof;
  (iv) about 0.1 to about 5.0 wt. %, about 0.5 to about 5.0 wt. %, or about 1.0 to about 2.0 wt. % of hydroxypropyl guar, based on the total weight of the skin dough composition, preferably balanced with the same or similar amount by weight of an additional starch in the form of a cellulosic gum-like gelling starch such as, for example, *sclerotium* gum or xanthan gum;
  (v) about 1.0 to about 40.0 wt. %, about 5.0 to about 35.0 wt. %, or about 10.0 to about 30.0 wt. % of a C16-C18 fatty acid salt, based on the total weight of the skin dough composition, preferably magnesium stearate, or alternatively sodium stearate, calcium stearate, magnesium myristate, magnesium palmitate, or calcium or sodium myristate or palmitate salts;
  (vi) one or more additional starches, for example, about 0.1 to about 30.0 wt. %, about 0.1 to about 20.0 wt. %, or about 0.1 to about 15.0 wt. %, based on the total weight of the skin dough composition, in particular, one or more polysaccharide powders or gums; and
  (vii) optionally, one or more skin active agents, also referred to as dermal active ingredients, for example, about 1.0 to about 20.0 wt. %, or about 1.0 to about 10.0 wt. %, of one or more skin active agents based on the total weight of the skin dough composition, preferably selected from the group consisting of humectants, thickeners, emollients, clays, bleaching or whitening agents, herbal active ingredients, amino acids, vitamins, minerals, scents, colorants, vitamin C and its derivatives, a fruit acid, *Spilanthes acmella*, alpha-hydroxy acid, glycolic acid, lactic acid, beta hydroxy acid, kojic acid, L-ascorbic acid, niacinamide, dimethicone, copper peptide, linseed extract, rice protein, caffeine, hesperetin laurate, ceramide, cholesterol, proxylane, and ascorbyl glucosidearbutin, ascorbyl glucoside, hydroxyquinone, alpha and beta arbutin, ferulic acid, lucinol and its derivatives, kojic acid, resorcinol and derivatives thereof, sodium silicate, titanium dioxide, zinc oxide, avobenzone, homosalate, octinoxate, octisalate, octocrylene, oxybenzone, tranexamic acid and derivatives thereof, gentisic acid, homogentisic, methyl gentisate or homogentisate, dioic acid, D pantheteine calcium sulphonate, lipoic acid, ellagic acid, vitamin B3, linoleic acid and its derivatives, ceramides and their counterparts, extracts derived from plants such as chamomile, bearberry, the aloe family (vera, ferox, bardensis), mulberry, skullcap, *Actinidia chinensis*, extracts of *Paeonia suffruticosa* root, extracts of brown and molasses extracts, hyaluronic acid and derivatives thereof, adenosine, citric acid, malic acid, lactic acid, tartaric acid, salicylic acid, a vitamin, a mineral, a retinoid, retinal, retinol, retinoic acid, a carotenoid, an amino acid, a protein, an enzyme, a coenzyme, and a mixture thereof.

Glycerin

Glycerin, also referred to as glycerol, is a polyhydric sugar alcohol with chemical name propane-1,2,3-triol, formula $C_3H_8O_3$, and a molar mass of 92.09 g/mol. Glycerin is present in all natural fats, oils, and phospholipids and is the chemical backbone of triglycerides and widely considered safe for use in human skin and food products. Glycerin can be obtained from pure plant sources and is an effective humectant and moisturizer in cosmetic and dermatological formulations. Glycerin can also be used as a good solvent for various water-insoluble ingredients in cosmetic and dermatological compositions and has effective emollient and lubricant properties, including humectant, moisturizing, conditioning, and thickening properties. Glycerin is also known for attracting water to the intercellular space of the skin and protects the lipids of skin cells. In the present composition glycerin acts as a humectant and moisturizer and gives the skin dough a sheen-like appearance and skin feel. Glycerin also has antimicrobial and antiviral properties and is used in wound and burn treatments. Preferably the glycerin is present in the composition at an amount of 20-40% by weight greater than 20% by weight, or between about 25-35% by weight.

Medium Chain Glycerides

Medium-chain glycerides (MCGs) are glyceride (glycerol) esters with one, two, or three fatty acids having an aliphatic tail of 6-18 carbon atoms, i.e. medium-chain fatty acids (MCFAs). MCGs are used in pharmaceutical formulations in solutions, liquid suspensions and lipid-based drug delivery systems for formulating emulsions, self-emulsifying drug delivery systems, creams, ointments, gels, and foams as well as suppositories. MCGs are also suitable for use as solvent and liquid oily lubricant in soft gels and are used in food preparation, texturing, and as carrier oils or solvents for flavours and oral medicines and vitamins. MCGs are also used as texture agents and emollients, and in the present composition melt at body temperature to provide melting sensation, softness, and spreadability to the skin dough. Rich food sources for commercial extraction of MCGs include palm kernel oil and coconut oil. In the skin dough composition, preferred MCGs comprise two straight chain fatty acids to provide the lubricating, oily, and stretch texture to the dough. Preferable straight chain MCFAs include C6 caproic acid, C8 caprylic acid, C10 capric acid, C12 lauric acid, C14 myristic acid, C16 palmitic acid, and C18 stearic acid. Other MCGs that can be used comprise single or mixed straight or branched saturated C6-C18 alkyl esters of glycerol, for example Lipocire® from Gattefosse can also be used, which contains C10-C18 triglycerides. Another example of a suitable medium chain glyceride is caprylic/capric triglyceride, sold as Crodamol® GTCC.

The MCGs can also be mixed with alkanes such as coconut alkanes of C13-C19. Natural sources of MCGs include but are not limited to coconut oil, vegetable oil, and palm oil. The present composition may also additionally comprise glycerol monostearate, which is a monoglyceride glycerol ester of stearic acid commonly used as an emulsifier in foods. Other glycerol compounds mono-substituted with a fatty acid may also be used in the skin dough composition to adjust for, for example, flowability, lubricity, and skin feel. Optionally, the glycerol monostearate can be formulated as a citrate. Preferably the medium-chain glycerides are medium-chain diglycerides, medium-chain triglycerides, or a combination thereof. Preferably the MCGs in the composition comprise glycerol esters of caprylic acid, capric acid, lauric acid, myristic acid, palmitic acid, stearic acid, and combinations thereof. In some embodiments the medium-chain glycerides can comprise at least one shorter chain fatty acid, such as C6-C10, and at least one longer chain fatty acid, such as C14-C18. In other embodiments the medium-chain glycerides can comprise a mixture of C6-C18 fatty acid esters of glycerol. In preferable embodiments the medium-chain glycerides comprise most or all straight chain, saturated fatty acid esters. The medium-chain glycerides can also comprise some fraction of branched and/or unsaturated fatty acid esters. Additional non-glyceryl fatty acid esters and non-polar compounds can also be included in the skin dough, including but not limited to coco-caprylate ester and coco-caprylate/caprate such as Cetiol® (dicaprylyl carbonate) from BASF Chemicals and the nonpolar hydrocarbon hemisqualane ($C_{15}H_{32}$) (Neossance®) from Centerchem. Some Hydroxypropyl Guar Hydroxypropyl guar is a propylene glycol ether of guar gum (*Cyanopsis Tetragonoloba*) and is in the family of hydroxypropyl celluloses. Guar gum is a high molecular weight polysaccharide composed of the sugars galactose and mannose (galactomannan, a large polymeric molecule with a high molecular weight) whose backbone is a linear chain of β1,4-linked mannose residues to which galactose residues are 1,6-linked at every second mannose, forming short side-branches. The molecular weight of native guar gum is approximately 50,000-8,000,000, with average molecular weight of native guar between about 2-3 million daltons. Hydroxypropyl guar is a hydroxypropyl derivative of guar gum where some of the hydroxy groups in the cellulose have been hydroxypropylated. The degree of substitution (DS), also referred to as the molar substitution (MS), of hydroxy propyl groups in hydroxypropyl guar is between about 0.2-1.5. In the present formulation, it has been surprisingly found that hydroxypropyl guar provides stretch and substance to the dough sufficient to enable the skin dough composition to maintain its shape and elasticity while being able to be flattened into a thin sheet for occlusive therapy.

Preferable hydroxypropyl guars for the present composition have a viscosity of 1000-5000 centipoise (cps) at 1% after 2 hours at a pH of 5-7.

Hydroxypropyl guar is a non-ionic thickening agent that is effective at low concentrations for transparent formulations and safe for use in cosmetic formulations. It is compatible with cationic surfactants, has good compatibility with electrolytes and stability over a large range of pH, helps to stabilize emulsions, and offers a unique "fluid" smooth feel to flowable cosmetic product. Hydroxypropyl guar can also be used as thickening agent and for emulsion stabilising in cosmetic compositions, as well as an antistatic agent, binder, emulsion stabilizer, film former, surfactant, and viscosity increasing agent. Additionally hydroxypropyl guar can be used as a skin softening and/or texturing agent, as a repairing agent, and as a conditioning or moisturizing agent. In preparing the skin dough composition as presently described, maintaining the manufacturing temperature of the hydroxypropyl cellulose (hydroxypropyl guar) at less than 60° C. maintains stability and avoids ingredient degradation in order to achieve the desired stretch and strength of the resulting skin dough. One preferred hydroxypropyl guar is high molecular weight hydroxypropyl guar with a degree of hydroxypropyl substitution of 0.4-0.8 DS. Used in cosmetic compositions, hydroxypropyl guar has also been found to help mitigate the irritation caused by surfactants. By both binding to anionic cleansing surfactants and depositing on the cells surface, hydroxypropyl guar has been found to reduce protein denaturation occurring upon exposure of keratinous materials to detersive and surfactant agents. In the present skin dough composition, hydroxypropyl guar is preferably present in an amount by weight of 0.1-20% by weight, and more preferably in an amount of 0.5-10% by weight, and more preferably in an amount of 0.5-5.0% by weight.

In addition to the hydroxypropyl guar, the present skin dough formulation can also comprise one or more additional cellulosic starches or gums to adjust the consistency of the skin dough to make it flowable, stretchy, and non-sticky. The present composition can also optionally comprise other cellulosic gums, for example *sclerotium* gum, xanthan gum, pullulan, gum Arabic, chios mastic gum, and microcrystalline cellulose for use as thickeners and emulsion stabilizers. Other cellulosic gums or gelling agents that may be added include but are not limited to acacia, agar, algin, alginic acid, ammonium alginate, amylopectin, calcium alginate, calcium carrageenan, carnitine, carrageenan, dextrin, gelatin, gellan gum, native guar gum, guar hydroxypropyltrimonium chloride, hectorite, hyaluronic acid, hydrated silica, hydroxypropyl chitosan, hydroxypropyl guar, karaya gum, kelp, locust bean gum, natto gum, potassium alginate, potassium carrageenan, propylene glycol alginate, *sclerotium* gum, sodium carboxymethyl dextran, sodium carrageenan, tragacanth gum, xanthan gum, biosacharide gum, acacia senegal gum, hydrolyzed rhizobian gum, and mixtures thereof. As an alternative to hydroxypropyl guar, succinoglycan may also be used.

Additional starch materials can also be used that are isolated from any plant source of starch, which are native or unmodified or chemically modified, including, for example, corn, wheat, rice, sorghum, pea, potato, tapioca (cassava), sweet potato, and sago, and may be a native, cross-linked, or chemically modified starch. Starches can provide a flowable, velvety feel to the skin dough composition, reducing stickiness, and enabling easy peel-off with no residual. In one example the present composition can comprise hydroxypropyl methylcellulose, or cellulose 2-hydroxypropyl methyl ether, which is a high-purity, water-soluble, non-ionic, cellulose ether. In cosmetic formulations hydroxypropyl methylcellulose displays reversible hot water gelation, water binding and retention, thickening, film formation, binding, emulsification, suspending and stabilizing abilities, in addition to being an emulsion stabilizer and thickener, lubricant, emollient, binder and film former. Additional powdered starch can also be provided as a component of a kit with the skin dough composition to reduce the stickiness of the skin dough.

Another example starch that may be used in the present composition, optionally as part of a combination of multiple starches, is pullulan. Pullulan is a natural polysaccharide polymer produced by fermentation which has been found to provide a lifting effect and smoother texture to cosmetic products. Pullulan provides lubricity with a natural silicone-like texture at low concentrations and has adhesive and film forming properties when used at higher levels, such as in mascaras, hair styling products, and face masks. Pullulan also improves foam retention and can be used for water-free cosmetics as a binder, thickener, film former, lifting agent, texture enhancer, and wrinkle tightener, and is salt, heat, and alkali resistant. Another example additional starch is rice starch NS, which is a cross-linked, non-swelling rice starch (dimethyl imidazolidinone crosslinked rice starch) with a particle size of 7-11 micron diameter. Because of the small particle size, RICE NS is used as a powder ingredient for fine face powder, make-ups as compact powders, complexion groundings, eye shadows, powder pencils and loose powders. In the present skin dough composition RICE NS can provide a velvety, creamy texture and fluency to the dough and a glimmery or matted look. RICE NS is also demonstrates gentles on skin, does not irritate mucosa, and possesses a thermal conductivity and is therefore cooling the skin.

C16-C18 Fatty Acid Salt

C16-C18 fatty acid salts are comprised of a long chain fatty acid with a carboxylic acid end group. These molecules serve as lubricants, thickeners, and flow agents in cosmetic compositions. C16-C18 fatty acids can be combined with an inorganic salt, such as magnesium, sodium, or calcium to provide a C16-C18 fatty acid salt. One preferable C16-C18 fatty acid salt in the present composition is magnesium stearate. Stearic acid is a straight chain saturated fatty acid with 18 carbon atoms. Magnesium stearate is an ester of magnesium and stearic acid with a molecular formula of $Mg(C_{18}H_{35}O_2)_2$, a molecular weight of 591.27 g/mol, and a melting point 130-145° C. (266-293° F.). Magnesium stearate is widely used as a texturizer, opacifier, and non-gelling thickener for a variety of personal care products and color cosmetics, magnesium stearate also acts as film-forming and anti-caking agent, has mild emulsifying properties, and is useful as a lubricating agent for enhanced slip and silkiness. In the skin dough composition magnesium stearate acts as one or more of a texturizer, opacifying agent, non-gelling thickener, lubricating agent, anti-adherent, anti-caking agent, thickening agent, release agent, emulsifier and binding agent. Other stearic acid salts may be used, including sodium stearate and calcium stearate. Alternatives to magnesium stearate may also be used, including but not limited to magnesium myristate and magnesium palmitate, or other myristate (C17) or palmitate (C16) magnesium, sodium, or calcium salts.

Emulsifiers

An emulsifier is used in the composition to emulsify and stabilize the ingredients. The emulsifier also supports the consistency and the oil binding capacity of the composition and provides a soft and smooth appearance on the skin. A variety of emulsifiers can be used, including but not limited to cetyl alcohol, glyceryl stearate citrate, sodium stearoyl glutamate, and lecithin. Cetyl alcohol is a C16 fatty alcohol with the formula $CH_3(CH_2)_{15}OH$. Monoglycerides and monoglyceride salts can also be used as emulsifiers in the skin dough composition. In one example, glyceryl stearate (glyceryl monostearate) is a glyceryl ester of glycerol (glycerin) and stearate fatty acid. Monoglycerides, such as glyceryl monostearate, can be derived from vegetable oils, and can act as hydrophilic, PEG-free, anionic oil/water emulsifiers and emollients. Glyceryl stearate citrate is also well suited as an emulsifier for emulsions with a slightly acidic pH-value and can be used for sensitive skin.

In addition to the base components of the skin dough composition comprising the main ingredients glycerin, hydroxypropyl guar, C8-C18 medium chain glycerides, and magnesium stearate or other stearate salt, the skin dough can further comprise one or more other optional ingredients. Each of the ingredients has a function in the skin dough composition and can provide, for example, elasticity, smoothness, flowability, malleability, stability, skin active ingredients, and other favorable properties to the skin dough composition. These additives can adjust the consistency of the skin dough, or tailor the skin dough to particular skin treatments and skin conditions. For example, the skin dough composition may also comprise one or more emulsifiers, fatty alcohols, humectants, skin conditioners, cellulosic agents, thickeners, stabilizers, film-forming agents, pH stabilizers or buffers, texture enhancers, natural plant extracts, and non-ionic surfactants. In another example, the skin dough composition can comprise one or more hydrophilic non-ionic cosmetic surfactants. A hydrophilic non-ionic cosmetic surfactant can and has general functionality of a surfactant, emulsifier, solubilizer, and stabilizer. In one example, poloxamer gels can be used to control viscosity, control texture, stabilize emulsions, form a film on the skin, and has also been found to be useful in formulating active ingredients to enable the active ingredient in the composition to be released slowly over time. Poloxamer 338 and PPG-51/SMDI is sold under the tradename ExpertGel® EG312 by Polymer Expert can be used as an additive in the skin dough composition. Poloxamer 338 is a copolymer of ethylene oxide and propylene oxide with has an average molecular weight of 14,600, a viscosity of 2,800 cP, and a pour/melt point of 57° C. PPG-51/SMDI is a poly(oxy-1,2-propanediyl), .alpha.-hydro-.omega.-hydroxy-, polymer with 1,1'-methylenebis[4-isocyanatocyclohexane] (51 mol po average molar ratio) that acts as a film forming element. ExpertGel® EG312 is another example copolymer presenting PEO/PPO/PEO blocks with organic linking which is a thermosensitive gel with reversible gelation. ExpertGel® behaves as a liquid at ambient temperature and jellifies when the temperature increases, and forms a flexible and resistant film on the surface of the skin when used in the skin dough composition that is relatively unaffected by pH changes. It has also been found that the poloxamer copolymer keeps the dough pliable under temperature changes. Other poloaxamer gels can also be used, such as Other potential additive ingredients include but are not limited to humectants, thickeners, emollients, clays, bleaching or whitening agents, active ingredients including herbal active ingredients, amino acids, vitamins, minerals, scents, and colorants. Whitening or depigmenting agents include vitamin C and its derivatives, alpha and beta arbutin, ferulic acid, lucinol and its derivatives, kojic acid, resorcinol and derivatives thereof, tranexamic acid and derivatives thereof, gentisic acid, homogentisic, methyl gentisate or homogentisate, dioic acid, D pantheteine calcium sulphonate, lipoic acid, ellagic acid, vitamin B3, linoleic acid and its derivatives, ceramides and their counterparts, for example derived from plants such as chamomile, bearberry, the aloe family (vera, ferox, bardensis), mulberry, skullcap, *Actinidia chinensis*, extracts of *Paeonia suffruticosa* root, extracts of brown and molasses extracts.

Moisturizers, Humectants and Emollients

Water is constantly evaporating from the deeper layers of the human skin through an effect known as trans-epidermal water loss (TEWL). By regulating water content, human skin naturally maintains a dry, easily shed surface as a barrier against pathogens, dirt, or damage, while protecting itself from drying out and becoming brittle and rigid. Moisturizers modify the rate of water loss, emollients are ingredients that protect, moisturize, and lubricate the skin, and humectants are hygroscopic substances used to absorb water and keep skin moist by attracting and/or retaining moisture via absorption. Common moisturizers include cetyl alcohol, cetearyl alcohol, cocoa butter, isopropyl myristate, isopropyl palmitate, lanolin, liquid paraffin, polyethylene glycols, shea butter, silicone oils, stearic acid, stearyl alcohol and castor oil, as well as other oils such as, for example, passionflower oil, apricot oil, olive oil, and corn oil. In cosmetics humectants can be used in topical dosage forms to increase the solubility of a chemical compound's active ingredients, increasing the active ingredients' ability to penetrate skin or its activity time. Humectants can also be used in cosmetic products to counteract a dehydrating active ingredient, such as soaps, corticoids, and some alcohols. Some example humectants in addition to glycerin that can be added to the skin dough composition include but are not limited to aloe, propylene glycol, urea, honey, and sorbitol. Sorbitol can be used together with or alternatively instead of glycerin as a humectant in the skin dough composition. Sorbitol is a natural polyhydric alcohol with formula $C_6H_{14}O_6$ and molar mass 182.17 g/mol. Sorbitol has effective moisturizing properties and can stabilize cosmetic gels and provide good clarity. Sorbitol also has skin softening and conditioning effects and can support thickening effects of viscosity enhancers. Sorbitol is also relatively resistant to acids and alkalis and is stable at temperatures up to 180° C. and can be used as one or more of a humectant, stabilizer, skin conditioner, thickening agent, moisturizer, and plasticizer in the skin dough composition. Honey extract can also be used as a humectant in the present composition in addition to glycerol and is a natural humectant and moisturizer able to retain moisture on the skin with emollient properties. Other emollients may be used in the skin dough composition, for example diheptyl succinate, isononyl isononanoate such as AE Ester® from AE Chemie, C12-15 alkyl lactate ester such as Pelemol® from Phoenix Chemical Inc., and esters of propylene glycol and benzoic acid such as dipropylene glycol benzoate sold as Dermal® from Alzo International.

Clay

Clay is a natural mineral product with magnesium silicate as a main component. Various clays suitable for cosmetic and dermatological formulation are available, including but not limited to bentonite clay, Rhassoul or Ghassoul clay, kaolin clay, and green clay. In the present skin dough composition clay can be used to provide color to the composition, to adsorb or absorb active ingredients, particularly labile or volatile active ingredients, and to provide minerals, absorb oils, and improve the texture of the skin dough.

Dermal Active Ingredients

Additional dermal active ingredients can be added to the skin dough to provide added benefits, for example, antibacterial, antifungal, analgesic, increasing circulation, blood clotting, and other pharmaceutical and cosmetic effects. Other examples of active ingredient functions in the skin dough composition include but are not limited to: ingredients that help skin whitening (e.g. arbutin, niacinamide, ascorbyl glucoside, hydroxyquinone, etc.); ingredients that help to improve skin wrinkles (e.g. retinol, adenosine, sodium silicate, etc.); ingredients that help to block ultraviolet rays (e.g. titanium dioxide, zinc oxide, avobenzone, homosalate, octinoxate, octisalate, octocrylene, oxybenzone and the like); ingredients that minimize pores (e.g. niacinamide, etc.); and neurotransmitter or pain transmission inhibitory ingredients (e.g. xanthalene, menthol, camphor, methyl salicylate, salicylic acid, capsaicin, magnesium salts, etc.). Other non-limiting examples of skin-active ingredients include moisturizing ingredients, keratolytic agents, desquamating agents, keratinocyte proliferation enhancers, collagenase inhibitors, elastase inhibitors, anti-inflammatory agents, steroids, anti-acne agents, and skin antioxidants.

Hyaluronic acid, also called hyaluronan, is an anionic, non-sulfated glycosaminoglycan carbohydrate polymer of disaccharides, which are composed of D-glucuronic acid and N-acetyl-D-glucosamine, linked via alternating $\beta$-(1→4) and $\beta$-(1→3) glycosidic bonds. Hyaluronic acid is distributed widely throughout connective, epithelial, and neural tissues. Hyaluronic acid is an important component of articular cartilage and forms aggregates that absorb water and are responsible for the resilience of cartilage and its resistance to compression. The molecular weight of hyaluronan in cartilage decreases with age, however the amount increases. Hyaluronic acid also plays a lubricating role in muscular connective tissues to enhance sliding between adjacent tissue layers and is a major component of skin where it is involved in repairing damaged skin tissue. In particular, hyaluronic acid has a key role in skin tissue regeneration, inflammation response, angiogenesis, and wound repair. Hyaluronin has the chemical formula $(C_{14}H_{21}NO_{11})_n$ and comes in a wide range of molecular weights, from a molecular weight of about 4000 to 8,000,000 Daltons. Hyaluronic acid with low molecular weight (LMW-HA), also known as sodium hyaluronate, is easily absorbed and penetrates the deepest layers of skin providing intense moisture and sustained hydration deep in the skin, whereas as the hyaluronic acid molecule gets bigger and the molecular weight higher, with high molecular weight hyaluronic acid (HMW-HA), the molecule remains closer to the surface of skin delivering the most visible results but with a shorter life-span. The selection of molecular weight of hyaluronic acid additive will depend on the desired activity of the composition. As a major component of the extracellular matrix, hyaluronic acid has a key role in tissue regeneration, inflammation response, and angiogenesis, which are phases of skin wound repair. Hyaluronic acid can come in various forms, including but not limited to as a hydrolyzed product, in salt form, and in acetylated form. Hyaluronate can also be formulated together with the clay to stabilize the hyaluronate. Hyaluronic acid, or cationic hyaluronate such as sodium hyaluronate, can be used in the skin dough composition to provide skin repair properties during hydrative occlusion and is used in dermatological compositions for anti-aging, wrinkle reduction, skin barrier protection, skin texture enhancement, repair agent, for hydration, as well as for skin detoxification. In one preferable composition, a proprietary preparation of a vectorized complex consisting of bentonite clay and high molecular weight hyaluronic acid (HMWHA) is incorporated into the skin dough composition. Normally, HMWHA cannot penetrate the epidermal layer; however, by altering the electrostatic charges at the HMWHA surface, what now seemed impossible, becomes possible. However, it is noted that the zeolite structure in clay can enable delivery of HMWHA in the formulation, enabling slow release of HMWHA over the treatment period. The HMWHA fills in the bentonite clay's intercellular spaces, resulting in a triple-action ingredient to access the skin's deep layers for long-lasting hydration penetration of the HA into the skin. This creates an immediate filling/smoothing effect on the treated area of the skin to allow the HMWHA to penetrate to the deeper layers of the skin. One example of clay-stabilized hyaluronate is Cristalhyal™ e-Perfection from Givaudan. It is noted that hyaluronic acid and its derivatives generally need to be added with water and are not miscible or dispersible in an oil-based foundation. In the present skin dough formulation, the hyaluronic acid or derivative can be incorporated into the dough itself, into the hydrating solution, or both, to provide positive lasting effects for the user.

One or more of a variety of other ingredients may also be added to the skin dough composition to add additional benefits and/or tailor the skin dough to a particular use case. Alpha-hydroxy acids (AHA) (glycolic, lactic, tartaric and citric acids) may be used in the skin dough to help with fine lines and wrinkles, irregular pigmentation and age spots, as well as shrinkage of enlarged pores. Alpha hydroxy acids are often derived from sugar cane and other plant sources, and common types of AHAs include glycolic acid, lactic acid, and citric acid, which hydrate by locking water into the skin. Glycolic acid can be added to exfoliate skin and boost collagen production to clear pores, smooth fine wrinkles, and hydrate the skin. Lactic acid can be added to exfoliate as well as moisturize skin. Beta hydroxy acids (salicylic acid) can be used to remove dead skin and improve the texture and color of sun-damaged skin and help with acne. Kojic acid can be used to remedy pigment problems and age spots. Retinol can be used to improve acne and acne scarring, improve mottled pigmentation, fine lines and wrinkles, skin texture, skin tone and color, and enhance skin's hydration levels. L-ascorbic acid (vitamin C) is an antioxidant shown to stimulate the synthesis of collagen, minimizing fine lines, scars and wrinkles and can also function in the skin dough as a dough preservative. Niacinamide (vitamin B3) is a form of vitamin B3 that helps build keratin and keep skin firm and healthy and can be used in the composition to retain skin moisture and stop skin flushing. Niacinamide has also been found to help reduce redness and swelling associated with rosacea. Dimethicone can be used to improve scar tissue and make skin feel soft. Recently, copper peptide, a naturally occurring copper complex of the tripeptide glycyl-L-histidyl-L-lysine, has also been found to be an effective skin regeneration product which promotes collagen and elastin production, acts as an antioxidant, and promotes production of glycosaminoglycans like hyaluronic acid. Copper peptide has also been found to firm, smooth, and soften skin.

Non-limiting examples of other particular skin-active ingredients that may be used in the present composition include sodium hyaluronic acid, niacinamide, peptides, linseed extract, rice protein, caffeine, minerals, hesperetin laurate, ceramides (e.g., ceramide-3 and/or ceramide-EOP), cholesterol, proxylane, and ascorbyl glucoside. Charcoal may also help remove impurities and dirt from the skin, improving its texture and appearance, and can be used to provide color to the skin dough. Skin conditioners can also be used impart at least some of the attributes of an emollient or a humectant, as well as provide improved lubricity and smoothness feel to the skin after treatment. Skin conditioners can also reduce skin irritation caused by other treatments and washing.

Botanical extracts, also referred to as active pharmaceutical herbal extracts, can also be added to the dough to increase the health, texture, and integrity of the skin, hair, and nails. In one example, *Spilanthes acmella* is a herbaceous plant that belongs to the daisy family recognized in traditional medicine throughout Asia and South America for a variety of properties including anti-inflammatory, diuretic, and aphrodisiac effects. The flowers of *Spilanthes* have earned it the name "toothache plant" for their numbing and pain-relieving effects, and animal studies suggest that compounds in *Spilanthes* may be effective for treating inflammation and promote wound healing as well as protect against or heal ulcers. In dermatological and cosmetic compositions *Spilanthes acmella* flower extract has been found have activity as an anti-aging active with effect against wrinkles and sagging. Other examples of botanical moisturizers which may be used include but are not limited to, ojon oil, soy extract, acai berry extract, feverfew extract, tea extract, chamomile, caffeine, coffeeberry extract, cumin seed oil, calendula extract, rosehip oil, grapeseed oil, licorice, sea buckthorn oil, shea butter, lavender oil, evening primrose oil, and jojoba oil. Fruit extracts may also be used, such as apple, pineapple, peach, apricot, jujube, and goji berry, which have high levels of pectin-based polysaccharides that are good at locking in moisture.

Particularly for wrinkle reduction, some compounds provide activity by increasing synthesis of or increasing activity of certain enzymes which, when brought into contact with an area of wrinkled skin, has the effect of reducing the appearance of wrinkles and/or fine lines. Exemplary anti-wrinkle actives may be chosen from, for example: desquamating agents, anti-glycation agents, inhibitors of NO-synthase, agents stimulating the synthesis of dermal or epidermal macromolecules and/or preventing their degradation, agents for stimulating the proliferation of fibroblasts and/or keratinocytes, or for stimulating keratinocyte differentiation reducing agents, muscle relaxants and/or dermo-decontracting agents, anti-free radical agents, and mixtures thereof. Some examples of such compounds include but are not limited to: adenosine and its derivatives; retinol and its derivatives; ascorbic acid and its derivatives; tocopherol and derivatives thereof; nicotinic acid and its precursors such as nicotinamide; ubiquinone; glutathione and precursors thereof; plant extracts including sea fennel and extracts of olive leaves; plant and hydrolysates thereof such as rice protein hydrolysates or soybean proteins; algal extracts; bacterial extracts; the sapogenins such as diosgenin and extracts of Dioscorea plants; A-hydroxy acids; β-hydroxy acids; lycopene; manganese salts and magnesium salts, especially gluconates; and mixtures thereof.

Amino Acids, Vitamins and Minerals

A mineral booster or bio-mineral complex may also be added to the dough composition and/or the hydrating solution. Trace elements such as, for example, sodium, zinc, magnesium and manganese have been found to have revitalizing properties and have a boosting effect on skin metabolism. In particular, sodium has been found to promotes good cutaneous enzyme function thanks to its moisturizing effect, magnesium has been found to controls energy production (ATP) and contribute to cell proliferation, manganese is known as an antioxidant and plays a role in skin regeneration, and zinc is known to be involved in cell division and differentiation, together with protein synthesis. Calcium has also been shown to stimulate keratinocyte cell differentiation in in vitro studies, to promote of lipids synthesis in ex vivo studies, and to inhibit metalloproteinase release in in vitro studies. Calcium helps the skin to carry out or regain its role as a barrier by stimulating the cell differentiation process and activating the synthesis of total epidermal lipids, notably ceramides. Trace minerals in their cationic form can optionally be combined and stabilized with a natural carboxylic acid, for example, L-Pyrrolidone Carboxylic Acid (PCA), which is a physiological molecule found in the skin, can be obtained by the cyclization of the L-glutamic acid, an amino acid of plant origin. In particular, sodium PCA, magnesium PCA, zinc PCA, manganese PCA, and calcium PCA have all been tested as additives to the present skin dough composition to provide a mineral booster to strengthen skin. Cellulosic additives may also be included in the mineral booster to stabilize the composition in a powder form such as maltodextrin, and optional preservatives may also be includes, such as, for example, phenoxyethanol and potassium sorbate. Example mineral boosters that may be used are PHYSIOGENYL® and Calcidone® sold by Solabia Cosmetics Group. The mineral booster can be present in the composition from about 0-3% by weight. Colloidal Sulfur can be present in the composition as 75% active content sulfur in a protective colloid and has been found to offer potential efficacy for topical treatments for acne, rosacea, seborrheic dermatitis, dandruff, pityriasis versicolor. In colloidal form, sulfur is easier to disperse and sulfur's natural odor is mitigated. One example colloidal sulfur that may be used is Sulfidal® sold by Vertellus. Colloidal sulfur can also be prepared with acacia gum as a powder additive to the composition.

Waxes and Esters

Waxes and fatty acid esters can also be used as additional ingredients in the composition to act as film formers, emollients, and plasticizers, and can help to create a creamy texture in the dough composition. In one example, the wax can be a polyhydroxystearic acid (12-hydroxyoctadecanoic acid, homopolymer) derived from a natural product such as castor oil and vegetable oils. Other waxes and non-glycerol based fatty acid esters that may be used include but are not limited to lauryl laurate, cetyl palmitate, cetyl stearate, beeswax, polyglyceryl-3 beeswax, stearyl stearate, jojoba esters (36-46 long chain fatty acid esters), stearyl behenate, heptyl undecylenate, polyhydroxystearic acid, and behenyl behenate. Example fatty acid esters both in the medium chain glyceride and in the non-glycerol based fatty acid esters are esters of C6-C18 hydrocarbon chains, both unsaturated and saturated, straight-chain or substituted. The wax or non-glycerol based fatty acid ester can be present in the composition in an amount of about 1-25% by weight. One preferred wax that can be used is polyhydroxystearic acid, commonly known as Kester® Wax K-60P manufactured by Koster Keunen. Other waxes may also be used such as, for example, beeswax, rice bran wax, soy wax, sunflower wax, jojoba wax, and other natural and synthetic waxes. Another specific example is candelilla wax, which is a mixture of n-alkanes, high molecular weight esters and alcohols, sterols, and free acids.

Antioxidants and Preservatives

Antioxidants and preservatives are used in cosmetic compositions help to neutralise the formation of free radicals and increase shelf stability of the composition. Preservatives can have antimicrobial, antifungal, and/or antibacterial properties. Preferable antioxidants used in the present skin dough composition include but are not limited to buah mera oil (*Pandanus conoideus* fruit oil), potassium sorbate, sodium benzoate, vitamin E, vitamin C, and coenzyme Q10, for example. One example of a natural antioxidant that can be used in the skin dough composition is PhytoCide® Elderberry from Active Micro Technologies LLC, which is a *Sambucus nigra* fruit extract which is an oil-soluble multifunctional natural alternative to the traditional preservatives used in cosmetic and personal care applications that has shown to have preservative, antifungal and antimicrobial activity. Other preservatives that may be used include but are not limited to propylene carbonate dehydroacetic acid, and phenoxyethanol such as Optiphen® from Ashland, Willow) Bark Extract Ferment Filtrate such as Arborcide® from Active Micro Technologies LLC. Other bacteriostatic and fungistatic agents can be used as preservatives in the present composition, for example caprylyl glycol, glyceryl laurate, glyceryl undecylenate, caprylhydroxamic acid, 1,2-hexanediol, hexylene glycol, propanediol, phenoxyethanol, undecylenic acid monoester, 1,2,3-propanetriol, potassium sorbate and combinations thereof, such as Spectrastat® from INOLEX Incorporated and Jeecide® from Jeen International.

Hydrophobic Additives

Other hydrocarbon and oil additives may also be optionally included in the skin dough composition to serve as emollients, carrier oils for herbal additives, moisturizers, and barrier protectors. Some examples include squalene, grape seed oil, olive oil, safflower oil, and petrolatum. Squalane is a saturated hydrocarbon derived by hydrogenation of squalene which is not subject to auto-oxidation and can be used as an emollient and moisturizer. Oils such as grape seed oil, olive oil, and safflower oil comprise a variety of saturated and unsaturated fatty acids including but not limited to C16 palmitic acid, C18 stearic acid, C16 palmitoleic acid, C18 oleic acid, C18 linoleic acid, C18 linolenic acid, C20 arachidic acid, C22 behenic acid, and C24 lignoceric acid, as well as squalene, carotenoids, phytosterols, tocopherols and phenolics.

Implementation of the present disclosure is provided by way of the following examples. The examples serve to illustrate the technology without being limiting in nature.

TABLE 2

Example Skin Dough Composition Recipes

| Function | Ingredient | A wt. % | B wt. % | C wt. % | D wt. % | E wt. % |
|---|---|---|---|---|---|---|
| Emulsifier | Cetearyl Alcohol, C6-C18 fatty acids, C6-C18 | 7.3 | 1.3 | 1.3 | 1.3 | 6.0 |
| Texture agent, lipophilic solvent, emollient | fatty acid esters (e.g. coco-caprylate, Jojoba esters) C6-C18 Medium Chain Glyceride | 28.2 | 31.4 | 30.4 | 35.4 | 31.0 |
| Humectant | Glycerin | 14.8 | 29.9 | 29.9 | 29.8 | 37.5 |
| Stabilizer, texture agent | Hydroxypropylguar | 2.2 | 1.4 | 1.4 | 1.3 | 1.75 |
| Texturizer | Magnesium Stearate | 15.6 | 31.2 | 30.2 | 27.2 | 5.5 |
| Preservative | Jeecide | 0.7 | 2.0 | 2.0 | 1.3 | |
| | Potassium Sorbate | | | | | 2.2 |
| Starch | Scleroglucan, Pullulan | 7.3 | 1.0 | 2.0 | 1.0 | 11.5 |
| Actives, Emollients, Buffers, pH adjusters | | 23.9 | 1.9 | 4.9 | 2.7 | 4.6 |

Formulations A-E shown in Table 2 were used to create various types of skin dough formulations and testing was performed on each dough to adjust for stickiness, malleability, ability to retain shape, and degradation over time. Dough softness was also assessed for different applications.

Method of Manufacture

To manufacture the presently described skin dough composition one example production process is outlined. It is understood that this is only one example process and that conditions, times, temperatures, mixing speeds, ingredients and amounts may vary based on the desired result of any specific composition. Specific ingredients referred to are described in the example specific dough composition provided, however it is understood that amounts and ingredients may vary.

The product is a thick, malleable, pliable, moldable, non-sticky dough that can be molded and generally holds its shape after molding. As described, additional starch can be added to the dough composition at the end to provide the pliability and smoothness and to alleviate any residual stickiness. It is understood that cellulosic starches have varying levels of hydration or moisture depending on manufacture, form, packaging, as well as humidity during manufacture and humidity during dough manufacture, and that amounts of starch can vary slightly to achieve the desired dough texture. In particular, cellulosic starches including hydroxypropyl guar can vary in moisture content between about 2-15%, accordingly the resulting dough should be adjusted to compensate for the added moisture content in the ingredients. The pH of the resulting skin dough should be about 5.6, or in the range of about 5.5-6.7. The pH of skin is 5.5 so the dough is cutaneous compatible, or compatible with skin, lessening the chance of adverse reaction. The addition of one or more base or acid, such as citric acid, can be used to adjust the pH of the dough to an appropriate level for skin compatibility.

TABLE 3

Example Dough Recipe

| Component | % by weight | Function |
|---|---|---|
| Cetyl Alcohol | 6.0 | emulsifier |
| mixture of C10-18 glycerides (Lipocire ®, solid) | 13.0 | texture agent and emollient |
| Caprylic (C8)/capric (C10) triglyceride (liquid) | 19.0 | emollient |
| Herbal Active (oil) | 1.5 | skin improvement effects |
| Glycerin | 37.5 | humectant |
| Hydroxypropyl Guar (Jaguar ®) | 1.75 | emulsifier |
| Pullulan | 4.0 | anti-stick, texturizing |
| Rice Starch NS | 5.5 | anti-stick, texturizing |
| Potassium Sorbate | 2.22 | preservative |
| Colloidal Sulfur (Sulfidal ®) | 0.01 | anti-acne active |
| Polyhydroxystearic Acid Wax (Kester Wax) | 2.0 | film former, emollient, and plasticizer |
| Mastic gum | 0.5 | thickener |
| Cellulosic Gum (sclerotium gum, Actigum ®) | 1.5 | thickener, stabilizer, texturizing agent |
| Silica (Aerosil ®) | 0.02 | bulking agent |
| Magnesium Stearate | 5.5 | preservative |

In this example production process there are three phases: Phase A which combines emulsifiers, waxes, emollients and humectant as well as any active ingredients; Phase B which contains the thickeners stabilizers, structurants, gum and bulking agents; and Phase C which finishes the dough at low temperature with added starches and preservative. The ingredients and phases are set out in Table 4 below.

TABLE 4

Example Manufacturing Method

| Phase | Component (General) | Component (Specific) |
|---|---|---|
| A combine at 60° C., cool to 50° C. before adding Phase B | emulsifier | cetyl alcohol |
| | emollient | C10-18 glycerides (solid) and caprylic/capric triglyceride (liquid) |
| | wax | Kester wax |
| | active ingredient | herbal active, colloidal sulfur |
| | preservative | potassium sorbate |
| | hydroxypropyl guar | |
| B combine at 35° C., then add to Phase A at 50° C. or less | mastic gum | thickener, stabilizer, texturizing agent |
| | glycerin | humectant |
| C combine with mixed Phases A/B at 30° C. | cellulosic starch | e.g. additional hydroxypropyl guar, rice NS, pullulan |
| | sclerotium gum | thickener, stabilizer, texturizing agent |
| | magnesium stearate | |

The composition mixing tank is prepared by washing, drying and sanitizing following the manufacturing and manufacturer protocol. The ingredients in Phase A and Phase B are weighed following weighing standard operating procedures and all ingredients are put into separate sanitized containers.

In a jacketed kettle equipped with side sweep and overhead Lightnin® mixer, the heat is turned on to maintain a temperature of between about 60° C. to 65° C. A mixture of the Phase A ingredients were prepared as follows to prepare the Phase A mixture. Cetyl alcohol was added into the tank follow by the mixture of C10-18 glycerides (solid) as these are the main waxes in this formula with melting point for both below 60° C. The temperature was maintained such that the maximum temperature did not exceed 65° C. The waxes were melted and combined using the overhead mixer with low shear. High shear can increase the temperature of the batch and temperature control was desired at all stages in the process. A thermometer was used to check temperature and maintain between about 60° C. to 65° C. Once the waxes were mixed the following composition additives were added one after each other slowly and gradually: caprylic/capric triglyceride (liquid), Buah Mera Oil (active ingredient), potassium sorbate, colloidal sulfur, and Kester wax K-60P. Once the materials were all added and started melting the mixture was mixed slowly at a speed of approximately 30 rpm. Once all the materials were dissolved and the liquid was clear the mixer was turned off and the heat maintained at a temperature around about 60° C.

Separately, in a small kettle, a mixture of the Phase B ingredients were prepared as follows to prepare the Phase B mixture. The glycerin and cellulosic gum (Chios Mastic Gum were premixed such that the Chios Mastic Gum was dissolved in Glycerin to reach a uniform texture. At a Phase A temperature in the jacketed kettle of 60° C. the overhead mixer speed was raised to 100 rpm and hydroxypropyl guar was then slowly added into the jacketed kettle with continuous mixing until the solution became semi-transparent (approximately 5-6 minutes) with continuous heating at no more than 60° C. Once the mixture became semi-transparent the mixture was cooled using the cooling jacket. It has been found that maintaining the temperature at no more than 60° C. ensures that the components waxes are not overheated, which can cause the final dough to be greasy. During the cool down period the overhead mixer was exchanged with a side sweep mixer and the mixing speed lowered to 30 rpm.

Once the temperature of the mixture reached 50° C. or below the Phase B mixture was into the Phase A and hydroxypropyl guar mixture. When the Phase B mixture contains temperature-sensitive active ingredients it is important to ensure that the mixture temperature is lower than the lability temperature for the active ingredient to ensure its stability during the manufacturing. The mixture was then cooled with the cooling jacket with very slow mixing until the temperature reached 30-35° C. with active temperature monitoring.

Once the temperature reached about 35° C. the cellulosic *sclerotium* gum was added to serve as a thickener and stabilizer and a preservative was added and the batch was mixed for 2-4 minutes at 30-100 rpm. Cooling of the mixture was continued and the mixture was stirred using a side sweep mixer at 30 rpm until it reached to 25-30° C. At this stage the texture of the mixture was like a chewing gum or soft dough.

The mixture was moved to a kneading machine with a temperature controller (cooling jacket) and the cooling jacket was set to maintain the machine temperature at a maximum of room temperature at 22-26° C. (71.5-78.8° F.). Maintaining the kneading temperature in this range provides the desired final texture for the dough composition. Once the kneading mixer was going and the temperature stabilized the magnesium stearate and a premixture of pullulan and Rice NS was added and the combined mixture was kneaded. Kneading was continued at ambient temperature until the dough became uniform and very smooth. The mixing temperature was maintained at less than 25° C. to prevent the composition from becoming sticky or greasy and to obtain the desired texture. Kneading was continued until the texture of the dough matched the bench dough sample, a total of about 20-25 minutes of kneading for a 500-1000 gram batch of dough. After kneading the dough does not feel too oily and should have a sheen to it but not be overly saturated with oil sitting on the outside. If after 30-45 min of kneading the dough has some remaining residual surface an additional aliquot of RICE NS or other cellulosic starch can be added to emulsify the oil and kneading can continue for about 15 minutes to thorough mix the dough until it matches the lab standard. The dough was then allowed to set for 24 hours, after which time the texture of the dough was checked to ensure that it matched with the standard. The resulting dough should not be greasy or sticky and should have good elasticity such that a sample ball should be able to stretch more than 1.5 inches or more without breaking. It is notable that the dough softens overnight during setting. After 24 hrs of resting and setting the dough can be measured, cut, weighed, and packed into suitable containers for storage.

The present skin dough composition has been found to be stable to hardening over time, enabling re-use of the dough. It can be left outside of its packaging for very long periods of time, although it is suggested to return the beauty dough back to its packaging within 1 hour of contact with air to prevent any possible introduction to air born bacteria or other contamination. When not in use, however, it is recommended to store the skin dough composition in a sealed container to prevent or limit introduction to airborne bacteria and other contamination. The skin dough composition can be supplied in a sealable container, such as, for example, in 4 oz/100 gr tin jar equalling 16 individual dermal dough skin treatment patches.

Method of Use

Using the skin dough for occlusive therapy is improved when the skin is wettened with a hydrating solution to provide sufficient water of hydration under the dough. The hydrating solution can be as simple as warm water splashed onto the treatment area. Alternatively, the hydrating solution can comprise one or more of water, glycerin, and/or hydrating gels, optionally together with one or more active ingredients for skin hydration and treatment. Some example active ingredients that can be incorporated into the dough can also be used as part of the hydrating solution, as previously listed. In one example water-based gel moisturizers optionally containing one or more of hyaluronic acid, glycerin, aloe, propylene glycol, alpha hydroxy acids, urea, and combinations thereof can be used, in addition to other active botanical and/or pharmaceutical ingredients. The hydrating solution can also be provided together with the skin dough as, for example, a liquid moisturizer, spray, gel, optionally comprising one or more additional actives that complement the dough formula and/or well as accelerates the benefits of the dough or actives in the dough.

The dermal skin dough composition is provided as a white to an off-white-colored base with a medium to firm texture accompanied by a sheen-like appearance due to fundamental glycerin and oil-based components. The color of the dough can also be matched to different skin tones by the addition of coloring, for example, one or more clays, iron oxide, and charcoal. Multiple dough colors can also be mixed together to customize the tint and tone of the dough. Charcoal can also be added to the dough to hide any impurities that may come off of the skin. Optional coloring agents can be added to the dough to change the dough composition color, including skin safe colorants, zinc oxide, and titanium oxide.

In preparation for use, kneading of the skin dough composition transforms the dough taken from the container from a medium-to-firm texture into a soft, pliable, elasticized, and stretchable-like structure. Kneading the dough also activates the dough to release its moisturizing properties onto the skin's surface. Once activated, the skin dough composition can be squeezed, pinched, rolled, molded, crimped, and flattened to conform to any size, contour, wrinkle, or line of the facial structure. At this stage an optional dose of additional active material may be added to the dough and mixed into the dough prior to use. If the dermal active material is labile or volatile it can thereby be added at the last minute to the dough and used immediately to deliver the active ingredient into the skin, avoiding long term storage of the labile active component with the dough. The boost of active ingredients into the skin dough can assist with delivery such that any active can be kneaded into the dough of any type of active in any form, for example liquid, gel, oil and even powder. By contrast, in a traditional cream the packaged composition is limited to the percent of active that the cream can emulsify, as the active ingredient can crash or precipitate or separate from the cream, de-emulsifying the cream and potentially having an effect on the cream viscosity. As such, the percentage active that can be formulated in the cream is limited by the lability and physical form of the active ingredient. By adding the active ingredient to the dough right before use a greater amount of active can be delivered to the skin. In a specific example, sodium silicate at a composition of over 6 percent in a cream destroys the viscosity of topical creams and leaves a white residue on skin. With the present skin dough composition up to and potentially more than 15 percent of sodium silicate can be added to the dough without causing a residue on skin after treatment and without changing the quality of the dough. Sodium silicate is used in skin care products to help reduce the appearance of fine lines and wrinkles.

Alternatively, the dermal active material can be provided in the hydrating solution and applied to the skin just before the dough is applied for the occlusive therapy. Dermal active material added to the dough can be provided as a solid powder, oil, or both, and can be kneaded into the dough by the user just prior to application. If the active dose added to the skin dough, the weather, or any other factor causes excessive stickiness, an aliquot or supply of cellulosic starch, such as one or more of hydroxypropyl guar, pullulan, rice NS, other starch, or a combination thereof, can be provided to the user to adjust the stickiness and texture of the dough. Additionally, a kit comprising the dough, a starch mixture for texture adjustment, and optionally one or more active ingredient and/or hydrating solution can be provided with the dough to provide a therapy kit that can be freshly created right before use. Additional refreshing doses of active material can be provided to recharge the dough such that it can be reused.

Occlusive Therapy with the Skin Dough Composition

To carry out the occlusive skin therapy with the skin dough composition in one example, a small amount of dermal skin dough composition is removed from its container with clean dry, fingers and hands, enough to make a ball approximately 1-1.5 inches in diameter. The dough is then carefully warmed up with body heat in the hands and kneaded with heat from the hands to activate the dough. A stretch test can be done using the fingers to test if the dough will stretch beyond one inch in length, to approximately 1½ inches to 2 inches. If the dough does not stretch out to 1½ inches to 2 inches then the dough should be kneaded with clean hands for an additional 20-30 seconds to ensure sufficient activation and stretch. The stretch test can be repeated until the dough is activated. If the dough stretches to 1½ inches or more without snapping apart then the dough is activated and ready to be formed into a treatment patch. It is understood that larger amounts of dough can be activated for larger patch treatments, with similar stretch tests used based on the % stretch of any dough sample. To form a treatment patch the activated and warmed dough can be shaped between the user's hands and rolled into a ball. The dough can then be flattened into a thin sheet, with the user's fingers, palms, or a flat surface, preferably to approximately 1.5-5.0 mm (about ¹⁄₁₆-³⁄₁₆ of an inch) in thickness, and preferably 1.5-3.5 mm in thickness, and to the desired size. Other mechanisms of molding the dough into an appropriate shape can also be used, including tools such as a roller, textured roller, or spatula. Alternatively a mold can be provided that the dough can be shaped into and removed from in order to provide an appropriate size and shape of dough patch for use on the skin.

The clean skin of the treatment area is moistened with a hydrating solution optionally with one or more additive. The hydrating solution can be as simple as a splash of lukewarm water, or may comprise glycerin, aloe vera gel, other hydrating gels, optionally with other hydrating components or active ingredients for treatment of the skin, as discussed herein. The hydrating solution creates an adhesive bond between the skin and the skin dough composition for effective application of hydration and other active components to the skin. Hydration or wetting of the skin prior to application of the flattened dough enables the flattened dough to bond with the skin and be affixed directly to the treatment area to provide effective hydrating occlusive therapy. Additionally, moistening of the skin and dough enables the dough to more successfully adhere to the skin and be received into hydrated wrinkles and pores in the skin.

To apply the flattened dough to the skin, the flattened dough can be gently pushed onto or into the skin of the treatment area moistened by the hydrating solution to create good contact between the dough and skin. This contact enables penetration of the treatment area with the dough including the active ingredients in the dough and/or the hydrating solution. This is particularly useful for wrinkle treatment as gentle pressure applied to the flattened dough on the skin enables the dough to be pressed into wrinkles such that the inside depths of the wrinkles can receive active compound. Because the dough is stretchable and malleable it easily acts like a liquid filler to fill wrinkles so that treatment can be received where it is most desired and ensures that the active compounds are released from the dough into the desired areas. The flattened dough can also be gently pushed and formed to the face after application. Gentle pressure applied to the flattened dough also seals the dough against the skin and does not dry out the way common sheet masks do and acts like a liquid filler that fills into deep wrinkles to deliver active material to where the skin needs it most. In some preferable uses, the skin dough composition can be applied to treatment areas under the eye, to the crow's feet, to the nasolabial folds around the mouth, to the glabellar lines between the eyes, to forehead wrinkles, to the back of hands, under the chin and around the jowls, to the scalp, to the lips, and to the décolleté.

Once applied to the skin the skin dough patch can be gently smoothed and pushed out the bottom and top edges of the patch using only the fingers. A light touch with the user's fingers when contact is made with the dough is all that is required to mold and shape the dough into its treatment location. The edges of the flattened dough can then be gently smeared and crimped to hold the dough in place during the treatment period. It has been found that gentle pressure on the flattened dough starting from the center and progressing to the dough edges is effective at obtaining good adhesion to the skin. The edges of the dough can then be smeared and/or crimped against the skin until all edges in their entirety have been smeared and crimped. Crimping and smearing the dough against the skin has been found to result in tight dermal adhesion with gentle pressure. The flattened, smoothened dough can then optionally be lightly rolled with a rod or similar device to ensure complete dermal adhesion and occlusive dermal contact around the contours of the face while filling in lines and wrinkles.

The dough is then left on the skin for anywhere from 1 minute to 12 hours, preferably from 1 to 180 minutes, 5 to 60 minutes, and more preferably for 15 to 30 minutes. As an example, the mask or skin dough composition may be allowed to remain on the skin for 1 to 30 minutes; 1 to 25 minutes; 1 to 20 min; 1 to 15 minutes; 1 to 10 minutes; 1 to 5 minutes; 5 to 30 minutes; 5 to 25 minutes; 5 to 20 min; 5 to 15 minutes; 5 to 10 minutes; 10 to 30 minutes; 10 to minutes; 10 to 20 min; or 10 to 15 minutes.

After treatment the dough can then simply be peeled off using the fingertips and is removed easily and painlessly in one or more pieces leaving little to no residue behind. Then skin can then optionally be rinsed with water to remove any residual hydrating solution or dough. During treatment some of the hydrating elements in the dough and hydrating solution reside on the surface of the skin for immediate hydration, while other properties of the hydrating complex work to penetrate the deeper layers of the skin, moisturizing from the inside out for prolonged hydration and/or moisturization. In a specific example of hand skin treatment, to moisturize the hands, the dough can be rolled between the palms of the hands, and then, using one hand, the dough can be rolled over the top of one hand until fully moisturized and then switched to the other hand using the same procedure. To use as a full body dough moisturizer, a patch of flattened activated dough can be applied over the area of concern, i.e., an area of dryness, on top of a hydrating solution.

After treatment the skin will appear to be glistening or shimmering, indicating the application area has been moisturized. Additionally, when using a hydrating solution comprising active ingredients, some of the active ingredients will remain on the skin after treatment, providing a prolonged treatment effect. The presently described dough retains pliability and malleability for the duration of the treatment period such that after treatment the dough can be peeled off and potentially used again. After treatment the dough can be re-used depending on the color and texture of the dough. Skin treatment with the presently described dough has been found to increase skin hydration when used as an occlusive therapy. Together with active ingredients to treat wrinkles including hyaluronic acid, the dough has also been found to show a significant decrease of fine lines and wrinkles with five minutes of treatment, with better results observed after 30 minutes of treatment. After five minutes of treatment users report that in use as a facial mask the occlusive treatment provided by the presently described skin dough composition unveils clear, baby-soft skin.

Demonstration 1—Crow's Feet Reduction

A woman aged 64 years old applied the product containing actives to the eye contour area for crow's feet (lateral canthal lines) wrinkle reduction. To provide occlusive therapy to reduce wrinkles around the eye, the treatment area was thoroughly washed, removing makeup, dirt and oil so actives can be deposited without any interference. Approximately 16 grams of the skin dough composition was dispensed into clean, dry hands and formed into a dough ball with kneading to activate the dough and warm the dough with body heat. A stretch test was performed using the fingers, flattening the ball and then stretching the flattened dough to approximately one and half inch without snapping or breaking. If the dough isn't properly stretched to one and half inch, the dough can be kneaded for another 20-30 seconds to provide the desired stretch and activation. Once the stretch test was confirmed the dough was stretched to one and a half inches without snapping, confirming that the dough is activated and ready for application.

With clean dry fingers, the skin dough ball was split into two equal halves (approximately 8 grams each) and one 8-gram dough sample was placed into the palm of the hand. The dough was rolled into a ball and the same was repeated with the remining half. Each dough ball was dispensed into clean, dry, supplied molds until the mold was filled to the edge and top without overfilling the mold. The shaped dough was then released from the mold, using a tool such as a spatula or dough knife. It is noted that use of a mold to shape the dough is optional and the dough can be shaped with a hand, palm, fingers, and/or other tool as desired.

To provide the occlusive therapy, the treatment area was lightly dampened with a skin activator. The skin activator applied to the skin comprised water and glycerin. The patch was applied before the skin activator solution dried. The dough was carefully stretched from the area closest to the eye to the outward opposing direction. Once applied to the skin, the dough was smoothed and pushed out using a stainless-steel texture patch roller to ensure complete dermal adhesion/contact around the contours of the face while filling in lines and wrinkles and ensure complete occlusive dermal contact.

Figure 2:
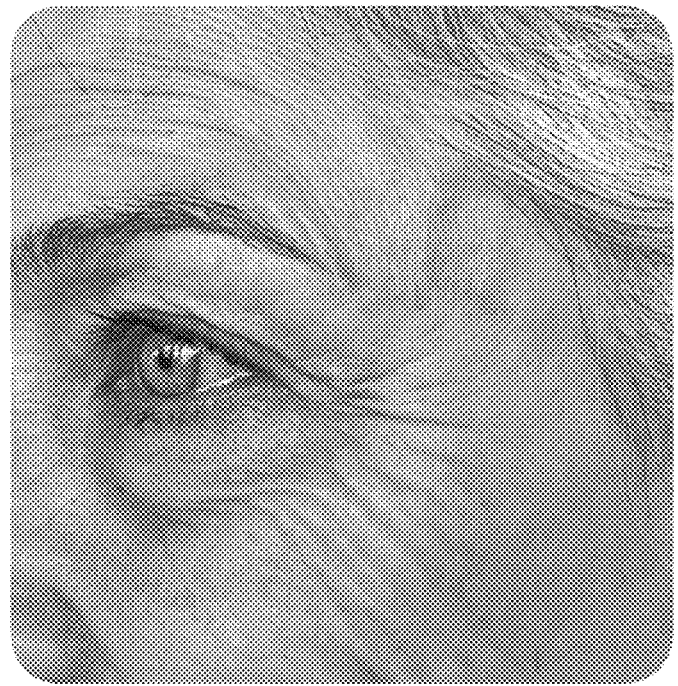
FIG. 2 shows photographs of a model before crow's feet occlusive treatment and after 30 minutes of treatment.
Figure 2:

FIG. 1 is a set of photographs of the model applying the skin dough and with the skin dough after optional texturing. Preferably the mean thickness of the cosmetic skin composition remains consistent and is not significantly altered when rolling. Using a compression tool to apply gentle pressure and compression to this skin dough patch with optional texturing or texture stamping allows for constant compression due to the dough being compressible. Teeth on the compression tool are spaced such that the tool does not stick to the applied skin dough pad or pull it up in any way, which would lesson the dermal contact of the skin dough pad with the skin during treatment. Optionally a burnisher, or round ball tool with a handle, can be used to smear and crimp the edges of the dough. The skin dough patch was left on for 1 minute and 30 minutes. FIG. 2 shows photographs of the model before crow's feet occlusive treatment and after 30 minutes of treatment. Wrinkle reduction around the eye is evident.

Demonstration 2—Jawline Wrinkle Reduction

Figure 3:
FIG. 3 shows photographs taken before jawline wrinkle reduction occlusive treatment, after 1 minute of treatment, and after 30 minutes of treatment.
Figure 3:
Figure 3:

A woman aged 64 years old applied the product containing actives to the jawline contour area. A similar procedure of treatment was followed as was conducted in the crow's feet reduction treatment. The hydrating solution used was the same as that used in the crow's feet reduction demonstration. FIG. 3 shows photographs taken before treatment, after 1 minute of treatment, and after 30 minutes of treatment. Wrinkle reduction around the jawline is evident.

Demonstration 3—Skin Hydration Using Corneometic Analysis

Figure 4:
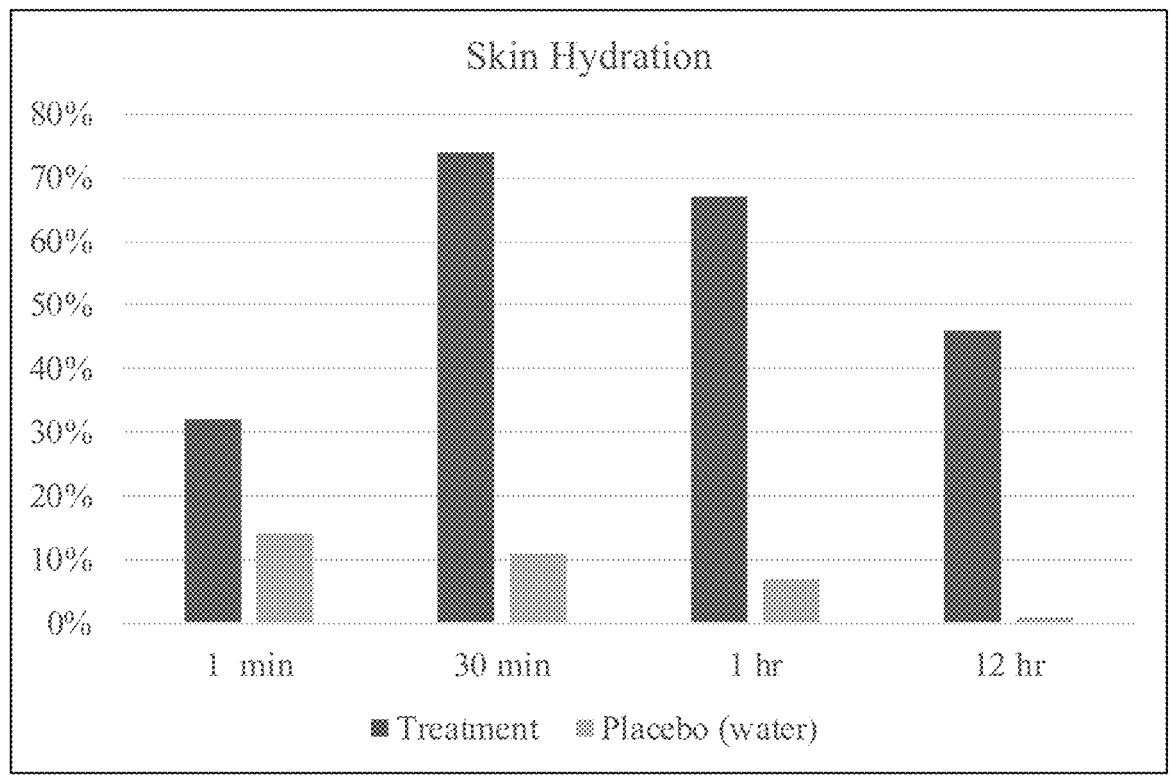
FIG. 4 shows the skin hydration results of a corneometric analysis after placebo control (water) compared to occlusive therapy with the present skin dough composition.

A corneometer evaluation determined the hydration level before and after applying the occlusive treatment vs. a placebo (water) on the forearm. The measurement is based on the capacitance measurement of a dielectric medium, where the stratum corneum is the uppermost layer of the skin. With increasing hydration, its dielectric properties change. The corneometer measurement is based on the fact that water has a higher dielectric constant (81) than most other substances (mainly<7). Gold tracks on top of the probe head, separated from the skin by a glass lamina, build-up an electric field between the tracks with alternating attraction. One track builds up a surplus of electrons (minus charge) the other a lack of electrons (plus charge). When put on the skin surface, the scatter field penetrates the very first layer of the skin. The Corneometer® CM 825 measures the change in the dielectric constant due to skin surface hydration changing the capacitance of a precision capacitor. The measurement can detect even the slightest changes in the hydration level. Unlike the impedance measurement, no galvanic relation between the device and the measuring object and no polarization effects exist. Measurements were taken at 1 min, 30 min, 1 hr and 12 hours after application. FIG. 4 shows the skin hydration results of the corneometric analysis after placebo control (water) compared to occlusive therapy with the present skin dough composition.

Demonstration 4—Nail Polish Removal

Figure 5:
FIG. 5 shows photographs of a subject before, during, and after nail polish removal.
Figure 5:
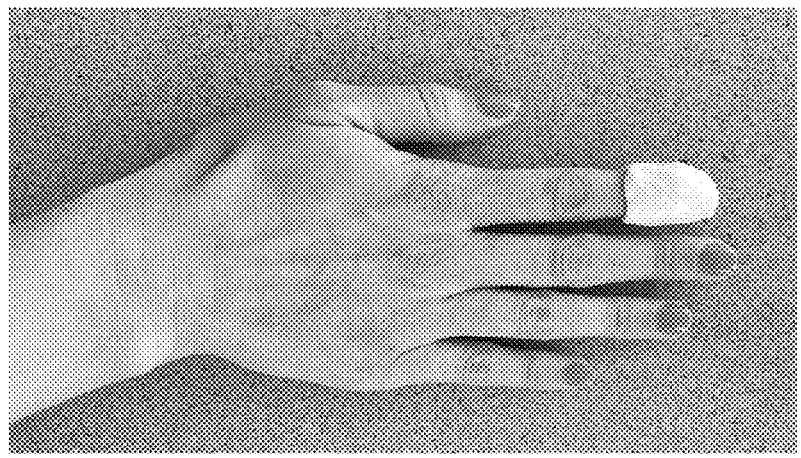
Figure 5:
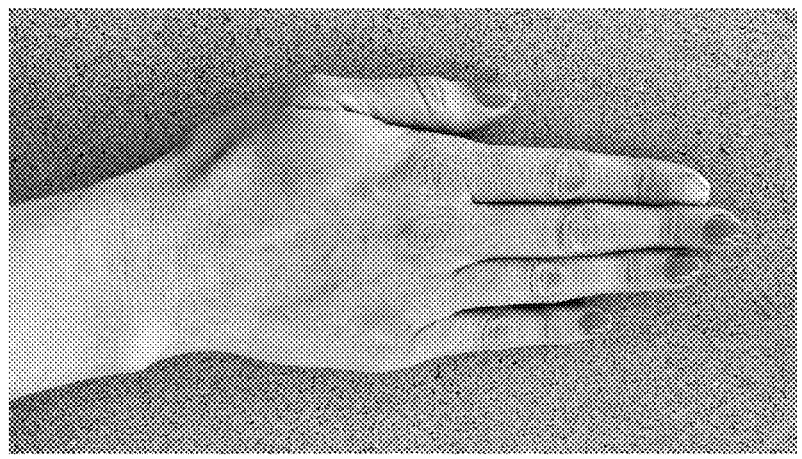

The skin dough composition was used to remove nail polish from nails. To remove the nail polish, first the nail and cuticle were covered with an amount of activator cream solution. In one example, the activator cream solution which dissolves nail polish acrylic, lacquer, or UV gel comprises ethyl acetate, ethyl lactate, ethanol, and propylene carbonate in a vehicle of ethylene and/or polypropyl glycol polymer and wax. Then the skin dough composition was applied as a cast around the finger with the treated nail and cuticle. The skin dough composition was gently pressed down against the nail and cuticle to create occlusive dermal contact with the nail and cuticle. To remove nail polish the skin dough composition with activator solution should remain in place for at least one minute, 1-2 minutes, or 1-5 minutes. Using the skin dough composition the nail and cuticle were gently rubbed to remove all of the nail polish. After all the polish has been removed the nails can optionally be rubbed gently with a cloth or cotton pad to remove any excess oil or activator cream. FIG. 5 shows photographs of the subject before, during, and after nail polish removal.

All publications, patents and patent applications mentioned in this specification are indicative of the level of skill of those skilled in the art to which this invention pertains and are herein incorporated by reference. The reference to any prior art in this specification is not, and should not be taken as, an acknowledgement or any form of suggestion that such prior art forms part of the common general knowledge.

The invention being thus described, it will be obvious that the same may be varied in many ways. Such variations are not to be regarded as a departure from the scope of the invention, and all such modifications as would be obvious to one skilled in the art are intended to be included within the scope of the following claims.

I claim:

1. A skin dough composition for occlusive therapy, the composition comprising:
   about 1.0 wt. % to about 15 wt. % of an emulsifier;
   about 20 wt. % to about 40 wt. % of glycerin, wherein glycerin is a humectant and moisturizer in the skin dough composition;
   about 20 wt. % to about 40 wt. % of C6-C18 medium chain glycerides;
   about 0.1 wt. % to about 5.0 wt. % of non-crosslinked hydroxypropyl guar; and
   about 1.0 wt. % to about 40.0 wt. % of a C16-C18 fatty acid salt;
   wherein:
      the skin dough composition is malleable and moldable and generally retains its shape after molding such that when molded to fit onto skin the composition provides tight and uniform dermal adhesion and complete cutaneous contact in occlusive therapy; and
      the skin dough composition does not dry out and remains malleable over a treatment period for the occlusive therapy.

2. The skin dough composition of claim 1, wherein the C6-C18 medium chain glyceride comprises glycerol having two or three straight chain C6-C18 fatty acid esters.

3. The skin dough composition of claim 1, wherein the skin dough composition can be flattened to a thickness of at least 3 mm without breaking.

4. The skin dough composition of claim 1, further comprising an additional starch selected from one or more of hydroxypropyl methylcellulose, corn starch, wheat starch, rice starch, sorghum starch, pea starch, potato starch, tapioca, sweet potato starch, sago starch, pullulan, *sclerotium* gum, xanthan gum, gum Arabic, mastic gum, and dimethyl imidazolidinone crosslinked rice starch.

5. The skin dough composition of claim 1, further comprising an active ingredient for antibacterial, antifungal, analgesic, increasing circulation, blood clotting, skin whitening, improving skin wrinkles, blocking ultraviolet rays, minimizing pores, inhibition of neurons for pain transmission, moisturizing, keratolysis, desquamation, keratinocyte proliferation enhancement, collagenase inhibition, elastase inhibition, anti-inflammatory, steroid treatment, anti-acne treatment, and antioxidant treatment.

6. The skin dough composition of claim 1, wherein the hydroxypropyl guar has a molecular weight of between about 2-5 million Daltons.

7. The skin dough composition of claim 1, further comprising one or more of silica, clay, zinc oxide, sodium silicate, poloxamer, or charcoal.

8. A kit comprising:
   a skin dough composition comprising about 1.0 wt. % to about 15 wt. % of an emulsifier, about 20 wt. % to about 40 wt. % of glycerin humectant and moisturizer, about 20 wt. % to about 40 wt. % of C6-C18 medium chain glycerides, about 0.1 wt. % to about 5.0 wt. % non-crosslinked hydroxypropyl guar, and about 1.0 wt. % to about 40.0 wt. % of a C16-C18 fatty acid salt; and
   a hydrating solution,
   wherein:
      the skin dough composition is malleable and moldable and generally retains its shape after molding such that when molded to fit onto skin the composition provides tight and uniform dermal adhesion and complete cutaneous contact in occlusive therapy; and
      the skin dough composition does not dry out and remains malleable over a treatment period for the occlusive therapy.

9. The kit of claim 8, wherein the hydrating solution comprises one or more of water, hydrating gel, hyaluronic acid, glycerin, aloe, propylene glycol, alpha hydroxy acids, and urea.

10. The kit of claim 8, further comprising a supply of cellulosic starch to reduce stickiness of the skin dough.

11. The kit of claim 8, wherein the hydrating solution is a liquid moisturizer, spray, or gel.

12. The kit of claim 8, wherein the hydrating solution comprises one or more dermal active ingredient.

13. The composition of claim 1, wherein the skin dough composition is used in occlusive skin therapy.

14. The kit of claim 12, wherein the dermal active ingredient is one or more of a fruit acid, botanical extract, *spilanthes acmella*, amino acid, vitamin, mineral, sodium silicate, hyaluronic acid, alpha-hydroxy acid, glycolic acid, lactic acid, tartaric acid, citric acid, beta hydroxy acid, salicylic acid, kojic acid, retinol, L-ascorbic acid, niacinamide, dimethicone, copper peptide, linseed extract, rice protein, caffeine, hesperetin laurate, ceramide, cholesterol, proxylane, and ascorbyl glucoside.

15. The kit of claim 12, wherein the dermal active ingredient is a humectant, whitening agent, depigmenting agent, antibacterial, antifungal, analgesic, agent for increasing circulation, blood clotting agent, sunscreen, pore minimizing agent, moisturizing, keratolysis agent, desquamation agent, keratinocyte proliferation agent, collagenase inhibition agent, elastase inhibition agent, anti-inflammatory, steroid, anti-acne agent, and antioxidant.

* * * * *